US006255374B1

(12) United States Patent
Sanchez et al.

(10) Patent No.: US 6,255,374 B1
(45) Date of Patent: Jul. 3, 2001

(54) HEAVY METAL FREE POLYVINYL CHLORIDE COMPOUND FORMULATION FOR INSULATING THIN WALL AUTOMOTIVE PRIMARY CABLE

(75) Inventors: Alfonso Perez Sanchez; Arturo Hjort Delgado, both of Querétaro (MX)

(73) Assignee: Servicios Condumes S.A. de C.V., Queretaro (MX)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/134,927

(22) Filed: Aug. 17, 1998

(30) Foreign Application Priority Data

Nov. 11, 1997 (MX) ........................................ 978672

(51) Int. Cl.[7] ........................ B32B 15/08; C08L 27/06; C08K 3/22; C08K 3/26; C08K 5/098

(52) U.S. Cl. ........................ 524/291; 524/400; 524/409; 524/411; 524/322; 524/425; 524/436; 524/567; 524/569; 428/374; 428/389

(58) Field of Search ................................ 524/569, 567, 524/291, 400, 409, 411, 436, 425, 322; 428/389, 379

(56) References Cited

U.S. PATENT DOCUMENTS

| | | | | |
|---|---|---|---|---|
| 4,058,471 | * | 11/1977 | Glatti et al. | 252/63.5 |
| 5,087,521 | * | 2/1992 | Choi et al. | 428/389 |
| 5,326,638 | * | 7/1994 | Mottine, Jr. et al. | 428/379 |

* cited by examiner

*Primary Examiner*—David W. Wu
*Assistant Examiner*—Kelechi Egwim
(74) *Attorney, Agent, or Firm*—Carmen Pili Curtis

(57) ABSTRACT

A formulation based on polyvinyl chloride compounds (PVC) particularly to high mechanical resistance compounds, specially with regard to abrasion. The composition does not have heavy metal based stabilizers and is used for insulation of thin wall automotive primary cable. The present invention includes a process to prepare said formulation.

20 Claims, No Drawings

HEAVY METAL FREE POLYVINYL CHLORIDE COMPOUND FORMULATION FOR INSULATING THIN WALL AUTOMOTIVE PRIMARY CABLE

BACKGROUND OF THE INVENTION

The present invention relates to a formulation of polyvinyl chloride (PVC) compounds, particularly to high mechanical resistance compounds specially with regard to abrasion resistance and that do not contain stabilizers based on heavy metals.

Hereinafter the polyvinyl chloride will be referred to as PVC. In the art, it is known as a product used extensively in insulation and covers for electric conductor cables because of its low price and its availability as well as because of its dielectric and mechanical properties and its chemical and environmental resistance.

For this kind of formulations, PVC is always used with the addition of plasticizers to remove its natural rigidity and to supply the wished flexibility. Other additive agents, such as thermic stabilizers, lubricants, pigments, charges, impact modifiers and flame retarders are included in the formulation to obtain a PVC with the wished properties.

PVC, on its own, is thermally unstable, because it decomposes at a temperature close to 150° C. releasing HCI and producing unsaturated sites in the polymer thereby causing chain reticulation and rupture, resulting in the degradation of the polymer properties. While the PVC is being decomposed the resin changes color and becomes rigid and fragile.

In order to improve thermal stability, stabilizers for PVC compounds are applied. The most commonly used stabilizers are generally metal salts and organic or inorganic phenols, organometallics, epoxy compounds and phosphites. In the case of compounds designed for the insulation of automotive primary cables, PACKARD ELECTRIC ES M 2397 specification states that the compounds used for the manufacture of thin wall cables according to specification ES M 3089 should be lead free.

The automotive industry is being affected by the following factors: the legislation regarding the environment that compels the minimization of the environmental impact of the present vehicles both with regard to the emission they produce and to their construction and the wish to increase the efficiency, safety, luxury and comfort offered by the present vehicles.

These requirements have forced the vehicle manufacturers to modify the materials employed in the fabrication of the vehicles as well as their performance in use.

The first modification was the elimination of the noxious materials found in the polymeric compounds, among them PVC, which contained lead because of economic and electrical advantages.

In order to reduce the environmental Impact there have been improvements in the internal combustion engines to optimize fuel consumption. On the other hand, vehicles of smaller dimensions and weights have been designed and spaces in the various compartments have been reduced, leaving less space for the devices and their connection harnesses, that are ever more numerous to improve both safety and luxury. For these reasons, vehicle manufacturers have modified the cable designs, reducing the insulation wall thickness to diminish weight and diameter in order to increase the number of circuits within the same space. Said walls thickness reduction should not affect their performance.

DESCRIPTION OF THE INVENTION

One way of accomplishing the requirements mentioned in the previous section is the use of a high molecular weight PVC resin, which will give to the compounds increased mechanical properties. However another substitute polymer is preferred to reinforce the PVC in its mechanical, abrasion, puncture, etc. properties since there is a shortage of resins of high molecular weight on the national market.

On the other hand, because of the breaking resistance requirements at low temperatures and in order to main its properties upon being exposed to high temperatures, 11 and 9 carbon atom co-ester phthalic type plasticizer has been chosen, which has a freezing point of −60° C. and a low volatility at high temperatures because it is a co-ester structure.

Among the principal characteristics that the cable must have, there are the following:

Breaking stress

Breaking elongation

Temperature resistance (aging in an oven)

Resistance to the different fluids to which the cable is exposed: gasoline, motor oil, transmission oil, hydraulic fluid, brake fluid, antifreeze fluid, battery electrolyte Abrasion resistance Low temperature breaking resistance Puncture resistance (slump resistance)

Flame resistance

The compounds with high resistance to abrasion, puncture and automotive fluids of the present invention are based on a PVC or another homologous resin blend with a series of additives. The number of the components of this formulation is expressed in parts per hundred parts of resin or additional resins.

All the components that integrate the formulation are materials of certified quality according to the following information:

a) PVC RESIN 250, homopolymer PVC resin of K value=70 that corresponds to a resin of medium viscosity and molecular weight, PVC Chemical Abstract. Registry No. 9002-86-2.

b) SYNPRON 1890 (Ferro Corporation Polymer Additives), Zinc based stabilizer that is substantially devoid of cadmium or calcium.

c) MORTHANE 455-300(Horton International Specialty Chemicals Group) ester type thermoplastic polyurethane resin.

d) Antimony trioxide, flame retardant according to Chemical Abstract Registry No. 01309-64-4.

e) Precipitated calcium carbonate, Chemical Abstract Registry No. 1317-65-3.

f) HI-SIL 233, Colloidal precipitated amorphous silica, Chemical Abstract Registry No. 112926-00-8.

g) PALATINOL 11 9p (BASF Corporation) 11 and 9 carbon atom co-ester linear phthalic plasticizer.

h) PALAMOLL 652(BASF Corporation), adipic polymer plasticizer.

i) IRGANOX 1076 octadecyl-3,5-diterbutyl-4-hydroxyhydrocinnamate, according to Chemical Abstract Registry No. 2082-79-3.

j) Calcium stearate, a lubricant with the following registration: Chemical Abstract Registry No. 1592-23-0.

k) POLYETHYLENIC WAX AC-629 Oxidized polyethylene homopolymer, Chemical Abstract Registry No. 9002-88-4.

In thermoplastic materials based on PVC, lead stabilizers such as dibasic lead phthalate and tribasic lead sulfate are frequently used as thermic stabilizer agents for electric use. However, in the case of the compounds designed for use in insulators of automotive cables and because of the requirements of the car manufacturers, zinc based stabilizers have been used even though other kinds of stabilizers can be used. Among them are barium soap, barium cadmium soap or a mixture thereof such as MARK OHM which is a barium cadmium soap.

Similarly, other antioxidants, besides IRGANOX 1076, can be used, such as TOPANOL CA, and the phenolics such as Bisphenol A.

Besides calcium stearate, a large number of lubricants can be used such as stearic acid, paraffinic and polyethylene waxes such as AC 629 A or a mixture of them.

As previously mentioned co-ester plasticizers have been chosen due to their low volatility at high temperatures and their low freezing point. However, depending on the final requirements of the cable, other plasticizers of other types can be used.

The preferred embodiment of the formulation object of the present invention defined in qualitative terms will be described hereinafter:

Polyvinyl chloride such as PRIMEX 250 resin, from 60 to 100 parts from 75 to 100 parts per hundred parts of resin.

At least a thermal stabilizer used in PVC compounds for automotive cables such as SYNPRON 1890, from 1 to 6 parts per 100 parts of resin, preferably from 3 to 4 parts per hundred parts of resin.

At least one effective antioxidant for PVC based thermoplastic materials, such as IRGANOX 1076 or a similar one, in a total quantity from 0.2 to 2.0 parts per 100 parts of resin.

At least a lubricant effective for PVC based thermoplastic materials, such as calcium stearate and/or similar or a mixture thereof, in a total quantity from 0.15 to 2.0 parts per hundred parts of resin.

A precipitated calcium carbonate charge and a colloidal silica charge in quantities from 10 to 50 parts per 100 parts of resin, preferably from 15 to 25 parts per 100 parts of resin.

A retarder based on antimony trioxide in quantities from 2 to 8 parts per 100 parts of resin, preferably from 3 to 6 parts per 100 parts of resin.

A PVC resin compatible urethane to improve the mechanical properties.

Process to prepare the formulation of heavy metal free halogenated polyvinyl for insulating thin wall automotive primary cables with an excellent abrasion resistance.

The compound of the present invention is prepared by using the steps individually known by those skilled in the art of the manufacturing of compounds. A high intensity cut mixer is used for the manufacturing of the compound till the dry blend is obtained; afterwards it can be plasticized through any of the following processes:

1. A Banbury internal blender during a determined period of time and at a determined temperature discharging the compound over a roller mill, obtaining strips of the compound that can be cut in a granule form.
2. Discharging the dry blend into continuous plasticizing and granulating machine or into another kind of compound processing machine.

At the beginning the plasticizers aggregated to the PVC resin together with the stabilizer in a high intensity blender, which does not require additional heating. The high intensity blender works until the dry blend is formed and the charges and lubricants are added during a two-minute period of time and then the dry blend is discharged into a cooler with water jacket to lower its temperature.

Once the dry blend temperature has been reduced, the compound is passed either through the extrusion-granulating machine, which plasticizes and disperses the blend and finally granulates the compound or through the Banbury internal blender which works the compound until the temperature reaches 160° C. The compound is then discharged on a roller mill where a strip is obtained which will finally be granulated to be fed to extrusion machine.

EXPERIMENT

The optimized formulation of the composition of the present invention for application in automotive cables was prepared according to what has previously been mentioned.

The cable obtained according to the formulation of the present invention was submitted to the tests established in the PACKARD ELECTRIC ES M2397 norm as a compound and to the PACKARD ELECTRIC ES M 3089 norm as a cable obtaining the approval for its application as insulator for the cables supplied to PACKARD ELECTRIC/GENERAL MOTORS, according to the following tests:

ES M 2397 sheet properties evaluation

ES M 3089 cable properties evaluation

What is claimed is:

1. A polyvinyl chloride composition suitable for insulation of thin wall automotive primary cable comprising a blend of:

a) from about 60 to 100 parts by weight of polyvinyl chloride resin (PVC);

b) from about 1 to 6 parts by weight of a zinc based thermal stabilizer, wherein the stabilizer is substantially devoid of cadmium or calcium and consists essentially of zinc as the sole metal stabilizer;

c) from about 0.2 to 2.0 parts by weight of an octadecyl-3,5-diterbutyl-4 hydroxy hydrocinnamate antioxidant;

d) from about 0.15 to 0.2 parts by weight of a calcium stearate lubricant;

e) from about 10 to 50 parts by weight of precipitated calcium carbonate filler;

f) from about 10 to 50 parts by weight of colloidal silica filler;

g) from about 2 to 8 parts by weight of antimony trioxide flame retardant;

h) an effective amount of a plasticizer for providing low volatility at high temperature and providing low freezing point, selected based upon the requirements of the cable; and i) optionally, up to about 100% by weight based on the amount of PVC of a PVC urethane polymer.

2. The polyvinyl chloride composition according to claim 1, wherein about 3 to 4 parts by weight of the zinc stabilizer are present.

3. The polyvinyl chloride composition according to claim 1, wherein about 15 to 25 parts by weight of each of precipitated calcium carbonate and colloidal silica are present.

4. The polyvinyl chloride composition according to claim 1, wherein about 3 to 6 parts by weight of antimony trioxide are present.

5. The polyvinyl chloride composition according to claim 1, wherein the plasticizer is selected from the group consisting of 11 and 9 carbon co-ester phthalic plasticizers and adipic polymer plasticizers.

6. The polyvinyl chloride composition according to claim 1 further comprising stabilizers selected from the group consisting of barium soap, barium cadmium soap and mixtures thereof.

7. The polyvinyl chloride composition according to claim 1, further comprising lubricants selected from the group consisting of stearic acid, paraffin wax, polyethylene wax and mixtures thereof.

8. The polyvinyl chloride composition according to claim 1, further comprising antioxidants selected from the group consisting topanol and phenolics.

9. The polyvinyl chloride composition according to claim 1, wherein about 3 to 4 parts by weight of thermal stabilizer is present.

10. The polyvinyl chloride composition according to claim 1, wherein about 15 to 25 parts by weight of calcium carbonate and colloidal silica is present.

11. The polyvinyl chloride composition according to claim 1, wherein about 75 to 100 parts by weight of PVC is present.

12. The polyvinyl chloride composition according to claim 11, wherein the PVC urethane polymer is an ester type thermoplastic polyurethane polymer.

13. A process for the preparation of the heavy metal free halogenated polyvinyl chloride composition according to claim 1 comprising the following steps:

(1) blending said polyvinyl chloride and said plasticizer in a high intensity blender;

(2) adding said thermal stabilizer to said blender to form a dry blend;

(3) adding said carbonate and silica fillers and lubricating agent to said blender;

(4) discharging the product of step (3) in the form of a powder into a cooler to reduce the temperature; and (5) plasticizing and granulating the product of step (4) at about 160° C. to obtain a product suitable for extrusion as insulating material for automotive primary cable.

14. The process according to claim 13, wherein the high intensity blender does not require additional heating.

15. The process according to claim 13, wherein the the blending period in step (3) is at least about 2 minutes.

16. A process for insulating automotive cables comprising the steps of:

a) applying a polyvinyl chloride composition comprising:

i) from about 60 to 100 parts by weight of polyvinyl chloride resin (PVC);

ii) from about 1 to 6 parts by weight of a zinc based thermal stabilizer, wherein the stabilizer is substantially devoid of cadmium or calcium and consists essentially of zinc as the sole metal stabilizer;

iii) from about 0.2 to 2.0 parts by weight of an octadecyl-3,5-diterbutyl-4 hydroxy hydrocinnamate antioxidant;

iv) from about 0.15 to 0.2 parts by weight of a calcium stearate lubricant;

v) from about 10 to 50 parts by weight of precipitated calcium carbonate filler;

vi) from about 10 to 50 parts by weight of colloidal silica filler;

vii) from about 2 to 8 parts by weight of antimony trioxide flame retardant;

viii) an effective amount of a plasticizer for providing low volatility at high temperature and providing low freezing point, selected based upon the requirements of the cable; and ix) optionally, up to about 100% by weight based on the amount of PVC of a PVC urethane polymer; and b) exposing the cable to high temperature.

17. The process according to claim 16, wherein about 3 to 4 parts by weight of the zinc stabilizer are present in the composition.

18. The processs according to claim 16, wherein about 15 to 25 parts by weight of each of precipitated calcium carbonate and colloidal silica are present in the composition.

19. The process according to claim 16, wherein about 3 to 6 parts by weight of antimony trioxide are present in the composition.

20. The process according to claim 16, wherein the plasticizer is selected from the group consisting of 11 to 9 carbon co-ester phthalic plasticizers and adipic polymer plasticizers.

* * * * *